Patented Nov. 3, 1925.

1,560,202

UNITED STATES PATENT OFFICE.

HERMAN A. BRASSERT, OF CHICAGO, ILLINOIS, ASSIGNOR OF ONE-HALF TO CHARLES W. ANDREWS, OF DULUTH, MINNESOTA.

METHOD FOR THE PURIFICATION OF GASES.

No Drawing. Application filed November 30, 1923. Serial No. 677,916.

*To all whom it may concern:*

Be it known that I, HERMAN A. BRASSERT, a citizen of the United States, residing at Chicago, in the county of Cook and State of Illinois, have invented certain new and useful Improvements in Method for the Purification of Gases, of which the following is a specification.

This invention relates to a new and improved method for the purification of metallurgical gases such, for example, as blast furnace or producer gases.

Blast furnace gases and other similar gases carry with them considerable quantities of solid impurities in finely divided form. These impurities are a serious detriment in the use of such gases in the passages and brick work in coke ovens, open hearth checkerwork, hot blast stoves and other similar apparatus for utilizing the gases. These impurities clog up the checkerwork and passages and otherwise reduce the efficiency of the apparatus.

These gases have heretofore been washed or cleaned by various dry processes but all of these methods are costly on account of the loss of the sensible heat of the gas or because of the expense of installation and operation or for both of these reasons. Furthermore, it is extremely difficult if not impossible, to sufficiently remove all of the impurities by any of these methods so that those remaining will not do damage at the point of subsequent use.

The use of blast furnace or similar gases has therefore been limited in its applications. Heretofore many metallurgical furnaces and the like have used coke oven gas in order to have a fuel of great purity, and the coke oven gas before being used for heating coke ovens, melting or heating furnaces or the like has, in the process of its manufacture and preparation, been scrubbed and purified to a very complete degree of cleanliness. Such gases as coke oven gas are, however, expensive to produce both due to the cost of the fuel and of the installation necessary for their production.

It is an object of the present invention to provide a new and improved method for the purification of gases without loss of their sensible heat.

It is a further object to provide a method of this character in which the gases are passed through material which material is at a relatively high temperature and which material has a temperature of fusion higher than that of the temperature of the impurities carried by the gases.

Other and further objects will appear as the description proceeds.

The process of my present invention may be carried out in various manners and with various types of apparatus.

The gas as it comes from its source of production, as, for example, a blast furnace or gas producer, is at a comparatively high temperature and has entrained therewith the various impurities and dust, as has been stated.

These various impurities are removed by passing the hot gas through a passage or chamber containing heated materials which materials have a higher fusion point than that of the impurities contained in the gases. These materials are maintained at a temperature greater than that of the fusion point of the impurities. This heat is maintained by any desired means or in any desired manner, which, in itself, forms no part of the present invention.

It should be noted, however, that since the gas is preferably passed through the material while hot, there need be no very great amount of heat taken by the gas from the material during the passage. After the solids have thus been removed, the gases may be cooled in order to recover tar, ammonia and light oils.

The material used to remove the gases may vary widely, provided only that its fusing point is above that of the impurities to be removed. It may be incandescent coke if desired, or may be brick checkerwork. It may be any other suitable material adapted to stand the necessary heat and to provide sufficient voids for the passage of the gases.

When gases carrying impurities are passed into checkerwork such as placed in regenerators or stoves, a large part of the impurities are deposited in the checkerwork and clog it. This is due to the loss of velocity of the gas and also to the tortuous passage which it must follow. This mechanical removal differs materially, however, from the removal contemplated by the present invention. Here the impurities are sintered or conglomerated or fluxed by the heat and are thus removed.

It is to be understood that the apparatus for applying my method would be placed between the source of gas and its place of use. If checkerwork is used a plurality of chambers would be used alternately so that when one became clogged it could be torn down and rebuilt while another is in use. This method would consequently cause no lost time such as would be the case where the checkerwork or brickwork of a furnace or oven clogged with the impurities. Further the cost of dismantling and rebuilding checkerwork or the equivalent to carry out my process would be materially less than that of rebuilding oven or furnace checkers.

My method may be carried out in many ways and by various instrumentalities and I contemplate such changes and variations as come within the scope of the appended claims.

I claim:

1. The method of purifying metallurgical gases which comprises passing the gases through materials heated to a temperature higher than the fusion temperature of the impurities, whereby the impurities are sintered.

2. The method of purifying metallurgical gases which comprises passing the gases while at a high temperature through materials heated to a temperature higher than the fusion temperature of the impurities, whereby the impurities are sintered and fluxed the material being so disposed as to provide tortuous passages and large surface contact for the passage of the gases.

3. The method of purifying metallurgical gases which comprises passing the gases through a bed of coke heated to a temperature greater than the fusion temperature of the impurities carried by the gases whereby the impurities are sintered and agglomerated with the coke.

Signed at Chicago, Illinois, this 9th day of March 1925.

H. A. BRASSERT.